Patented Aug. 29, 1939

2,170,972

UNITED STATES PATENT OFFICE 2,170,972

PROCESS FOR TREATING ANHYDRIDES

Herbert E. Martin, Cumberland, Md., assignor to Celanese Corporation of America, a corporation of Delaware No Drawing. Application December 24, 1936, Serial No. 117,613

11 Claims. (Cl. 260—546)

This invention relates to the removal of sulphur from acetic anhydride for use in the production of organic esters of cellulose of improved characteristics, such as improved stability and clarity, for spinning into filaments or for forming into sheets and foils. This invention relates more specifically to the treatment of the organic acid anhydride used in forming the ester, part of which anhydride is continually recirculated through the process.

An object of the invention is the production of a non-corrosive organic ester of cellulose that formed into filaments or sheets does not discolor upon contact with metals and exposure to light. Another object of the invention is the production of an organic ester of cellulose that is stable in the presence of light and metals when in solution, such as a solution used for forming filaments and foils. Other objects of the invention will appear from the following detailed description.

In the manufacture of organic esters of cellulose, the esterification of the cellulose is usually conducted by treating a batch of cellulose with an excess of organic acid anhydride in the presence of a substantial amount of a diluent or solvent for the cellulose ester being formed. The diluent or solvent may be the concentrated acid corresponding to the acid forming the anhydride. After the cellulose ester has been formed there may be added to the solution sufficient water to convert the remaining anhydride to acid and the batch is permitted to ripen or hydrolyze to the desired solubility. Upon attaining the desired solubility characteristics, the cellulose ester may be precipitated by the addition of water, separated from the solution and then washed. In certain processes the acid and the acid anhydride are separated from the formed cellulose esters before ripening the cellulose esters or converting the anhydride to the acid. The separated dilute acid, drainings and washings are distilled or otherwise treated, such as by extraction with solvents or by neutralizing the dilute acid to form metal salts, for the recovery of the acid, which acid is used at least in part to form the anhydride for a succeeding bath of cellulose.

Thus in preparing cellulose acetate, cellulose is acetylated by treatment with acetic anhydride and a catalyst, in the presence of glacial acetic acid as a solvent for the cellulose acetate that is formed. After completion of the acetylation, the resulting solution of cellulose acetate in glacial acetic acid is separated by precipitation of the cellulose acetate upon the addition of water, and the aqueous solution of the acid is drained from the precipitate. The precipitation of the cellulose acetate may be performed before or after the cellulose acetate has ripened. The drainings or washings which are in the form of aqueous acetic acid are then treated by distillation, which may be in the presence of an entraining liquid, or by any other suitable process for the recovery of the acid. Some of the recovered acid is further processed to the anhydride.

A method of forming the anhydride is to neutralize the aqueous acetic acid liquor to form sodium or other metal acetate, and treating the dry acetate with sulphur dichloride or a mixture of sulphur and chlorine to form the anhydride. Both the acid and the anhydride are raised to the desired quantity by the addition of fresh acid and anhydride and returned to another acetylation bath.

In each cycle of this process, the anhydride becomes contaminated with sulphur and labile organo-sulphur compounds that are not completely removed in the ordinary rectifying processes. These compounds become attached to the cellulose ester and cannot be removed therefrom by washing, filtering or other like commercial expedients. It is these compounds that cause corrosion of tanks, pipelines, spinnerets, rolls or other metallic elements or machine parts that are contacted by the cellulose ester or solutions thereof. This corrosion not only destroys the equipment but the metal salts or oxides that are formed are dissolved or absorbed by the cellulose ester, or react with the cellulose ester and throw the same off color and destroy certain of its spinning properties. These sulphur and labile organo-sulphur compounds also cause a charring or browning of a solution of cellulose ester upon standing even when not in contact with metals or materials affected by the solution.

According to my invention, I treat the anhydride by agitating the same in the presence of a chlorine liberating compound that absorbs and/or reacts with the sulphur and labile organo-sulphur compounds whereby the anhydride which is returned to the esterifying process is substantially free from sulphur or sulphur compounds, or at most the undesirable ingredients are present in an amount which does not cause corrosion of the metal parts of the apparatus employed. This treatment of the anhydride may be effected concurrently with the fraction of the distillation employed to concentrate or it may be effected in a separate distillation.

Any chlorine liberating compound may be used in the process of my invention, and by chlorine liberating compound is meant any compound which would give free chlorine such as, for example, chlorine itself, sodium hypochlorite, potassium hypochlorite and calcium hypochlorite. I prefer, however, to use calcium hypochlorite. While good results, with respect to the reduction of the sulphur and labile organo-sulphur content of the anhydride, are obtained merely by the use of the chlorine liberating compound, I have found that optimum results are obtainable by distilling the anhydride, after it has been treated with the chlorine liberating compound, in the presence of a metal acetate, preferably sodium acetate.

The acid anhydride formed according to any suitable method from the esterification solution is treated according to this invention with a chlorine liberating compound by agitating the two together, by stirring a mixture of the two, or by any suitable method of bringing the anhydride into intimate contact with the chlorine liberating compound.

The acid recovered from the esterification process is concentrated and converted into the anhydride. This anhydride may contain as much as 60 to 100 parts per million of sulphur and labile organo-sulphur compounds. By treating this anhydride with a chlorine liberating compound, this contamination may be reduced to from 10 parts to less than 1 part per million, depending upon the amount of chlorine liberating compound used and the length of treatment. In using calcium hypochlorite as the chlorine liberating compound, the time of treatment required is from 15 to 20 minutes to 15 hours at room temperature. The amount of chlorine liberating compound will depend upon the nature of the same and when using calcium hypochlorite the amount will vary from 0.2 to 0.4% based on the weight of the anhydride treated.

In order further to illustrate the invention but without being limited thereto, the following specific examples are given.

*Example I*

1,500 ccs. (1650 grams) of acetic anhydride formed from acid recovered from the cellulose acetate acetylation solution is mixed with 6.6 grams (0.4% by weight) of calcium hypochlorite bleach (68% available chlorine) and shaken for 15 to 20 minutes and allowed to stand over night. The resultant mixture is then decanted into the distilling apparatus and 25 grams (1.5% by weight) of sulphur-free sodium acetate added. It is heated to boiling under atmospheric pressure, the temperature being 132° C., then cooled and distilled with vacuum. The distillate contained less than 1 part per million of sulphur and was found to have little or no corrosive action on copper or mercury.

*Example II*

1,500 ccs. (1650 grams) of acetic anhydride formed from acid recovered from the cellulose acetate acetylation solution is mixed with 3.3 grams (0.2% by weight) of calcium hypochlorite bleach (68% available chlorine) and shaken for 15 to 20 minutes and allowed to stand over night. The resultant mixture is then decanted into the distilling apparatus and 25 grams (1.5% by weight) of sulphur-free sodium acetate added. It is heated to boiling under atmospheric pressure, the temperature being 132° C., then cooled and distilled with vacuum. The distillate contained less than 3 parts per million of sulphur and was found to have little or no corrosive action on copper or mercury.

*Example III*

1,500 ccs. (1650 grams) of acetic anhydride formed from acid recovered from the cellulose acetate acetylation solution is mixed with 6.6 grams (0.4% by weight) of calcium hypochlorite bleach (68% available chlorine) and shaken for 15 to 20 minutes and allowed to settle. After mixture has settled it is decanted into a distilling apparatus and 25 grams (1.5% by weight) of sulphur-free sodium acetate added. The mixture is then heated to boiling with no vacuum, the temperature being 134° C. The mixture is then cooled somewhat and distilled with vacuum. The distillate contained about 3 parts per million of sulphur and was found to have little or no corrosive action on copper or mercury.

It is to be understood that the foregoing detailed description is given merely by way of illustration and that many variations may be made therein without departing from the spirit of my invention.

Having described my invention, what I desire to secure by Letters Patent is:

1. Process for reducing the content of sulphur and labile organo-sulphur compounds in anhydrides of lower aliphatic acids from 60 to 100 parts per million to less than 10 parts per million, which comprises treating the anhydride of the lower aliphatic acid with calcium hypochlorite in the presence of a metal acetate.

2. Process for reducing the content of sulphur and labile organo-sulphur compounds in acetic anhydride from 60 to 100 parts per million to less than 10 parts per million, which comprises treating the acetic anhydride with calcium hypochlorite in the presence of a metal acetate.

3. Process for reducing the content of sulphur and labile organo-sulphur compounds in anhydrides of lower aliphatic acids from 60 to 100 parts per million to less than 10 parts per million, which comprises treating the anhydride of the lower aliphatic acid with calcium hypochlorite in the presence of sodium acetate.

4. Process for reducing the content of sulphur and labile organo-sulphur compounds in acetic anhydride from 60 to 100 parts per million to less than 10 parts per million, which comprises treating the acetic anhydride with calcium hypochlorite in the presence of sodium acetate.

5. Process for reducing the content of sulphur and labile organo-sulphur compounds in anhydrides of lower aliphatic acids from 60 to 100 parts per million to less than 10 parts per million, which comprises agitating the anhydride of the lower aliphatic acid with calcium hypochlorite, and distilling off the anhydride of the lower aliphatic acid in the presence of a metal acetate.

6. Process for reducing the content of sulphur and labile organo-sulphur compounds in acetic anhydride from 60 to 100 parts per million to less than 10 parts per million, which comprises agitating the acetic anhydride in calcium hypochlorite, and distilling off the acetic anhydride in the presence of a metal acetate.

7. Process for reducing the content of sulphur and labile organo-sulphur compounds in anhydrides of lower aliphatic acids from 60 to 100 parts per million to less than 10 parts per million, which comprises agitating the anhydride of the lower aliphatic acid with calcium hypochlorite, and distilling off the anhydride of the lower aliphatic acid in the presence of sodium acetate.

8. Process for reducing the content of sulphur and labile organo-sulphur compounds in acetic anhydride from 60 to 100 parts per million to less than 10 parts per million, which comprises agitating the acetic anhydride in calcium hypochlorite, and distilling off the acetic anhydride in the presence of sodium acetate.

9. Process for reducing the content of sulphur and labile organo-sulphur compounds in anhydrides of lower aliphatic acids from 60 to 100 parts per million to less than 10 parts per million, which comprises agitating the anhydride of the lower aliphatic acid for 15 to 20 minutes with from 0.2 to 0.4%, based on the weight of the anhydride of the lower aliphatic acid present, of calcium hypochlorite, and then distilling off the anhydride of the lower aliphatic acid.

10. Process for reducing the content of sulphur and labile organo-sulphur compounds in acetic anhydride from 60 to 100 parts per million to less than 10 parts per million, which comprises agitating the acetic anhydride for 15 to 20 minutes with from 0.2 to 0.4%, based on the weight of the acetic anhydride present, of calcium hypochlorite, and then distilling off the acetic anhydride in the presence of 1.5% by weight of sodium acetate.

11. Process for reducing the content of sulphur and labile organo-sulphur compounds in acetic anhydride from 60 to 100 parts per million to less than 10 parts per million, which comprises agitating the acetic anhydride for 15 to 20 minutes with from 0.2 to 0.4%, based on the weight of the acetic anhydride present, of calcium hypochlorite, heating the mixture to boiling, cooling the same, and then distilling off the acetic anhydride in the presence of 1.5% by weight of sodium acetate.

HERBERT E. MARTIN.